Figure 1:
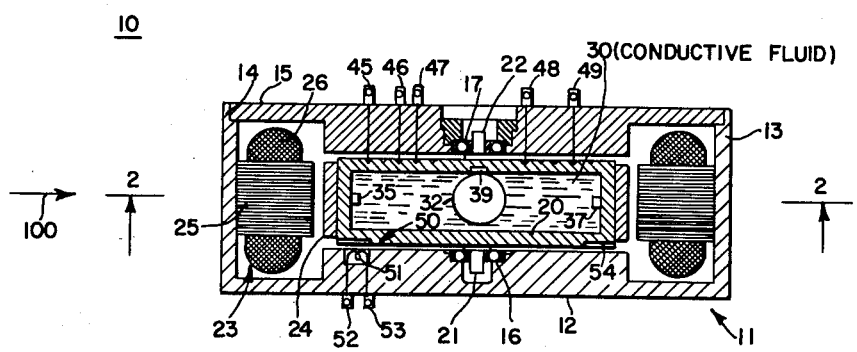

April 17, 1962 V. O. LOVELESS ETAL 3,029,644
ACCELEROMETERS
Filed March 20, 1959 3 Sheets-Sheet 1

INVENTOR.
VERNON O. LOVELESS
ROBERT C. STAATS
BY
ATTORNEY

April 17, 1962  V. O. LOVELESS ETAL  3,029,644
ACCELEROMETERS
Filed March 20, 1959  3 Sheets-Sheet 2
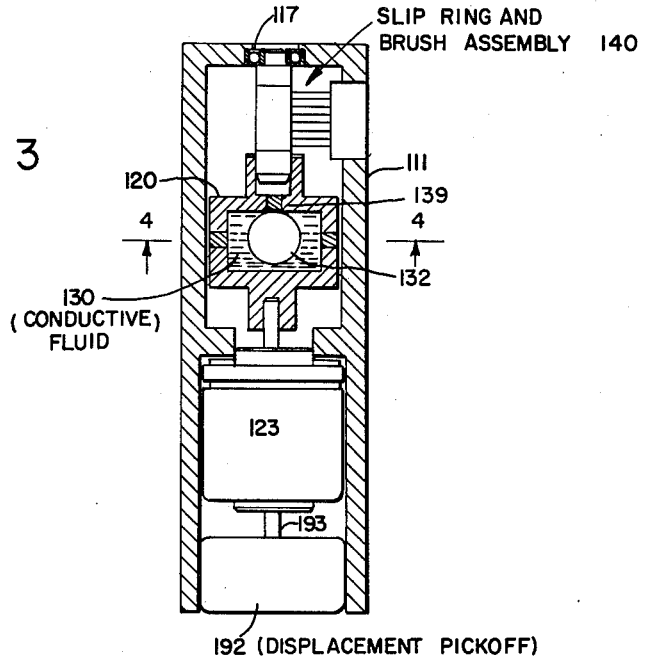
FIG 3
FIG 4
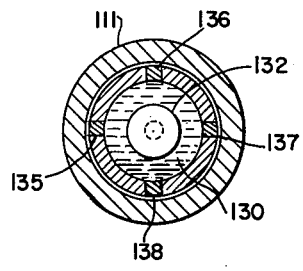
INVENTOR.
VERNON O. LOVELESS
ROBERT C. STAATS
BY Roger W. Jensen
ATTORNEY April 17, 1962    V. O. LOVELESS ETAL    3,029,644
ACCELEROMETERS Filed March 20, 1959    3 Sheets-Sheet 3

INVENTOR.
VERNON O. LOVELESS
ROBERT C. STAATS
BY
Roger W. Jensen
ATTORNEY

United States Patent Office 3,029,644
Patented Apr. 17, 1962

3,029,644
ACCELEROMETERS
Vernon O. Loveless and Robert C. Staats, Clearwater, Fla., assignors to Minneapolis-Honeywell Regulator Company, Minneapolis, Minn., a corporation of Delaware
Filed Mar. 20, 1959, Ser. No. 800,786
11 Claims. (Cl. 73—490)

This invention pertains to accelerometers, velocity meters, and distance meters of the double integrating accelerometer type. There exists at the present time a great need for simple reliable devices in these fields to produce signals for use in various systems such as inertial navigation systems. In the field of distance measuring devices at the present time various means are used for providing double integration of the acceleration of a body, these means taking the form of various electronic networks and/or various mechanical configurations. The prior art known double integration means have disadvantages of complexity, expense and, in some cases, inaccuracy. The present invention as applied to distance meters overcomes the disadvantages of the prior art double integration means.

The present invention comprises a hollow rotatable chamber filled with a fluid. A symmetrically shaped body constituting an acceleration sensor is positioned within the hollow member and is adapted to float in the fluid. Under conditions of zero acceleration the acceleration sensor is symmetrically positioned with respect to the fluid chamber. When the device is subjected to acceleration there is a relatively radial shifting between the symmetrically shaped acceleration sensor and the fluid chamber. The relative radial displacement is sensed by pickoff means which may take a variety of configurations. The signal from the pickoff means then is effective, through motor means connected thereto, to spin the fluid chamber about its rotational axis. The speed of rotation will be a function of the amount of the acceleration. The spinning of the hollow body will develop a centrifugal force tending to center the symmetrically shaped body or acceleration sensor with respect to the fluid chamber due to the difference in density between the acceleration sensor and the fluid. A point of equilibrium will be reached wherein the centrifugal force acting upon the sensor will be equal and opposite to the force of acceleration which initially displaced the sensor. The velocity of rotation of the chamber is a measure of the initial acceleration. The total angular displacement of the hollow chamber about its rotational axis is a measure of the velocity caused by the acceleration. The square of the total angular displacement of the chamber becomes a measure of the distance traveled by the body in response to the acceleration.

It is an object of this invention to provide improved accelerometers, velocity meters, and distance meters.

Another object of the invention is to provide a double integrating accelerometer comprising in part a hollow rotatable chamber filled with a fluid and supporting within a float or sensor member adapted to be radially displaced away from a centered position in response to acceleration, pickoff means for sensing the radial displacement, motor means effective when energized by said pickoff means to rotate the chamber at an angular velocity sufficient to develop a centrifugal force acting upon the sensor equal and opposite to the force produced by the initial acceleration, the system further including means for measuring the total angular displacement of the hollow rotatable member and means for producing a signal which is a function of the angular displacement signal raised to a power.

Figure 2:
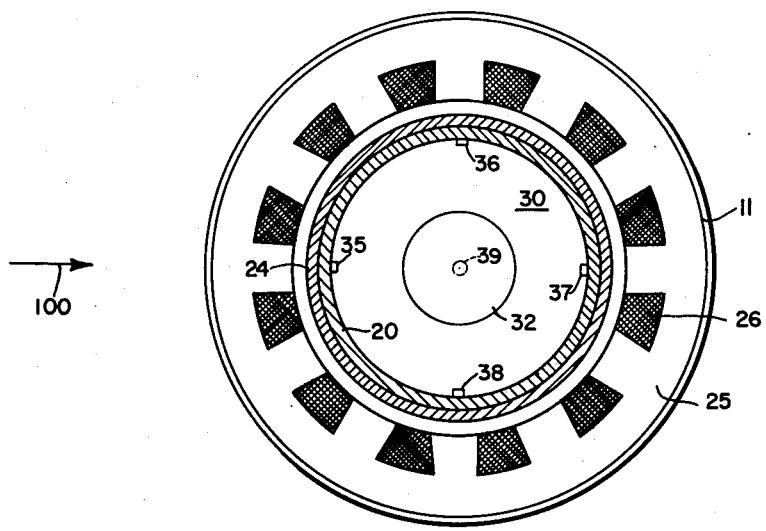
Figure 5:
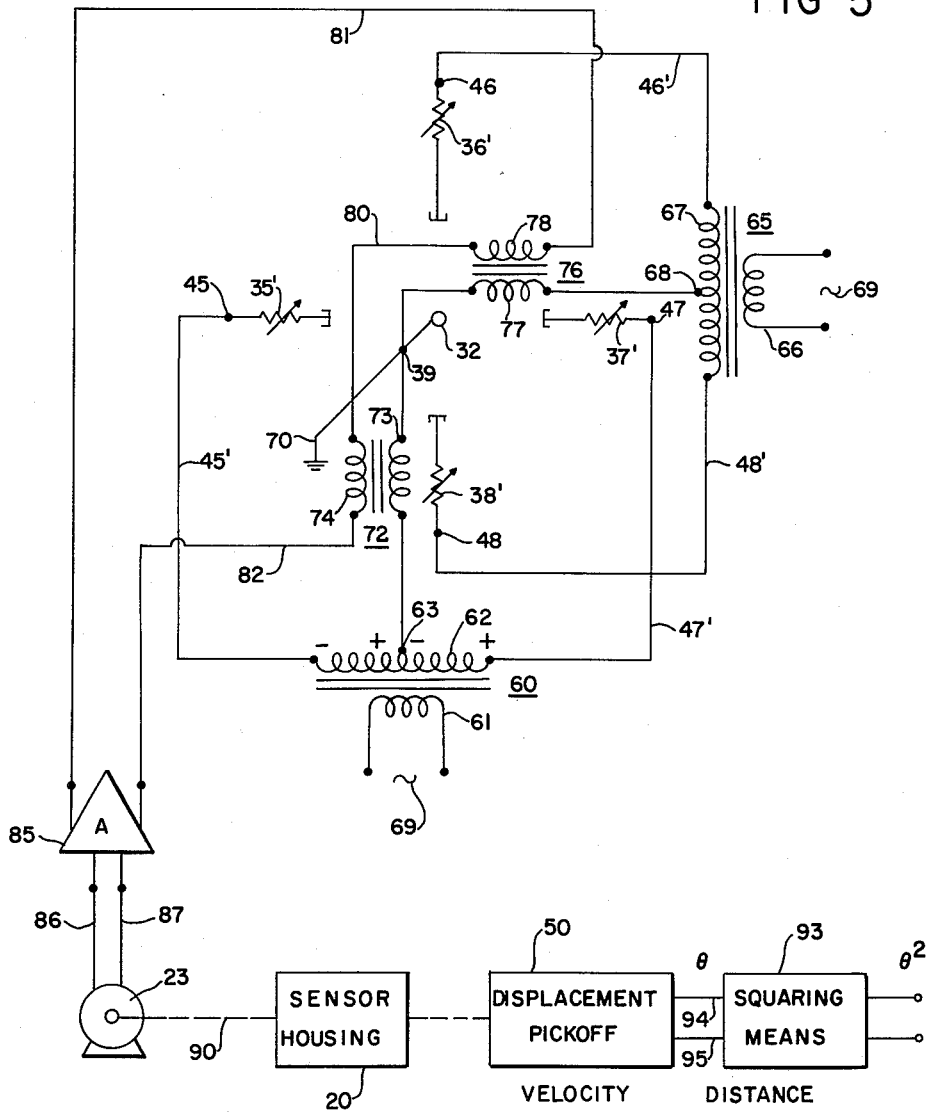

Other and more specific objects of the invention, including constructional details and the operation of accelerometers, velocity meters, and distance meters embodying our invention, will be set forth more fully in, and will become apparent from a reading of the following specification and appended claims, in conjunction with the accompanying drawings in which:

FIGURE 1 is a cross-sectional view of an accelerometer embodying the teaching of our invention;
FIGURE 2 is a cross-sectional view of the apparatus shown in FIGURE 1 as viewed along section lines 2—2;
FIGURE 3 is a cross-sectional view of a modified accelerometer;
FIGURE 4 is a cross-sectional view of the apparatus shown in FIGURE 3 as viewed along section lines 3—3; and
FIGURE 5 is a schematic diagram showing the control system for the accelerometer shown in FIGURES 1–4.

Referring now to FIGURE 1, reference numeral 10 generally depicts an accelerometer comprising a cup-shaped cylindrical housing 11 having a base portion 12 and a cylindrically shaped side portion 13, the open end of which is provided with a suitable recess 14 to receive a cover plate 15.

A pair of suitable bearing means 16 and 17 are respectively positioned centrally in the base portion 12 and the cover member 15. Bearing means 16 and 17 define a rotational axis for a hollow cylindrically shaped member or chamber 20 positioned within the cavity formed between the base portion 12 and the cover plate 15. Chamber 20 has a pair of stub shaft members 21 and 22 respectively adapted to fit within the inner races of bearing means 16 and 17. It will be understood that chamber 20 is supported by bearing means 16 and 17 for unlimited rotation about the rotational axis. A ring member 24 forming the rotor of a motor means 23 is mounted on the circumferential outer surface of the chamber 20 for coaction with a motor stator unit 25 concentrically positioned therewith within the base member 11. Motor stator 25 includes winding means 26 adapted, when energized, to develop a rotating magnetic flux which will coact with the rotor member 24 to impart a rotation to the hollow member 20. Rotor member 24 may be of any suitable material such as a hysteresis ring.

The chamber 20 is filled with a suitable fluid 30. A spherically shaped float member 32 is positioned within chamber 20. The fluid 30 and the float 32 are selected so that the fluid is more dense than the float. For the specific pickoff to be described herein, the fluid 30 is conductive and has predetermined resistivity characteristics. One type of fluid that is suitable is that disclosed in the B. E. Dixson Patent 2,713,726. It will be understood that for other pickoffs it is not necessary to have fluid 30 of the conductive type. As illustrated, the float member 32 has a spherical shape. It may be made out of solid or hollow material or may be a bubble of gas or liquid whose density is less than that of the fluid 30.

Pickoff means are provided for measuring relative radial shifting between the chamber and float means 32. The pickoff means shown includes a plurality of electrodes or contacts circumferentially positioned around the inside of the chamber 20. Four such electrodes 35, 36, 37, and 38 are shown (see FIGURE 2). In addition there is provided an axially positioned contact or electrode aligned with the rotational axis defined by bearings 16 and 17. Electrodes 35–39 are electrically insulated from one another except for the conductive fluid 30 (chamber 20 being of an insulative material) and each are electrically connected to a slip ring surface on the upper axial end of the member 20 as shown in FIGURE 1. A plurality of external terminals 45, 46, 47, 48, and 49 communicate with wipers adapted to bear aginst the slip rings associated respectively with the electrodes or contacts 35–39.

Pickoff means 50 are also provided for sensing the relative angular displacement of the hollow member 20 about its rotational axis. Such means are depicted somewhat schematically to include a sense coil 51 mounted in a suitable recess in the bottom or base portion 12 of the housing 11 and terminating in a pair of terminals 52 and 53. Sense coil 50 coacts with a suitably magnetically coded ring member 54 mounted on the lower axial surface of the chamber member 20 as shown in FIGURE 1.

The angular displacement pickoff means 50 including sensing coil 51 and coded ring 54 merely depict one type of pickoff that may be used with this device. Another type of pickoff which may be used with the present apparatus is the optical type shown in co-pending application of Vernon H. Aske and Arthur D. Glick, Serial No. 774,952, filed November 19, 1958, and assigned to the same assignee as the present invention. Other pickoffs such as capacitive or magnetic may also be used.

FIGURE 5 is a schematic diagram depicting the accelerometer shown in FIGURES 1 and 2 in combination with additional apparatus. It will be understood that when the float 32 is symmetrically positioned with respect to the circumferentially located electrodes 35–38 that there will be substantially the same amount of conductive fluid between each of the circumferentially located electrodes 35–38 and the axial electrode 39. It will be further understood that as the float 32 shifts radially with respect to the electrodes 35–38 in response to acceleration the effective resistance between the individual electrodes 35–38 and the center or axial electrode 39 will vary. Thus in FIGURE 5 the variable resistance between the center or axial electrode 39 and the four radially positioned electrodes 35–38 is depicted by four variable resistances 35', 36', 37', and 38'. For an example of how the resistances 35'–38' vary assume that the float member 32 radially shifted away from center toward electrode 37. The effective resistance between electrodes 37 and 39 (represented schematically in FIGURE 5 as variable resistance 37') would decrease while at the same time the resistance 35' would increase.

The control system includes a network having a pair of power transformers 60 and 65 each respectively comprising a primary winding 61 and 66, a secondary winding 62 and 67, and center taps 63 and 68 in the secondary windings. The primary windings 61 and 66 are adapted to be energized by a suitable source of alternating current 69. A suitable lead 45' connects terminal 45 of variable resistance 35' to one end of the secondary winding 62 of transformer 60, the other end of which is connected through a suitable lead 47', to terminal 47 associated with the variable resistance 37'. In the same manner a suitable lead 46' connects terminal 46 of variable resistance 36' to one end of the secondary winding 67 of the transformer 65, the other end of which is connected through a suitable lead 48' to terminal 48 of variable resistance 38'.

The float member 32 is depicted in FIGURE 5 and is connected through its associated axial or central electrode 39 to ground 70. The primary winding 73 of a first coupling transformer 72 is connected between terminal 39 and the center tap 63 of the secondary winding 62 of power transformer 60. First coupling transformer 72 also has a secondary winding 74. Electrode or contact 39 is also connected through the primary winding 77 of a second coupling transformer 76 having a secondary winding 78 to the center tap 68 of the secondary winding 67 of transformer 65. A lead 80 connects one end of secondary winding 74 to one end of the secondary winding 78. The other end of secondary winding 78 is connected through a lead 81 to a suitable amplifier 85.

Another lead 82 connects the other side of secondary winding 74 to the amplifier 85.

The amplifier 85 has a pair of output leads 86 and 87 connected to motor means 23 which schematically represents the motor means 23 shown in FIGURES 1 and 2 including rotor 24, stator 25, and winding means 26. It will be understood that amplifier 85 is connected through leads 86 and 87 to the winding means 26 on the stator 25. A dotted line 90 between the motor 88 and the chamber 20 represents the ability of motor means when energized to rotate the chamber 20 about its rotational axis defined by bearings 16 and 17. The chamber 20 is shown mechanically coupled to the displacement pickoff means 50.

A squaring means 93 is connected through suitable leads 94 and 95 to the displacement pickoff means 50. The squaring means is any suitable type known to those skilled in the art for producing an output signal which is the square of the input signal.

*Operation*

As indicated when the float 32 is in a center position relative to the chamber 20 then the resistance between the single axial electrode 39 and the four circumferentially spaced radial electrodes 35–38 will be the same. Thus, the resistances in the network shown in FIGURE 5, 35', 36', 37', and 38' are all equal. Under this condition which is representative of no acceleration being imparted to the accelerometer shown in FIGURES 1 and 2 the network will be balanced and no currents will flow through the primary windings 73 and 77 of the coupling transformers 72 and 76. Assume that the accelerometer 10 is subjected to an acceleration in the direction of the arrow 100 as shown in FIGURES 1 and 2. This will cause the sensor or float 32, since it is less dense than its surrounding conductive fluid 30, to move in the direction of the acceleration vector, or in other words shift for this example toward electrode 37. This motion will be detected by the displacement pickoff in the following manner. As the float 32 shifts in the radial direction toward electrode 37 then the effective resistance 37' will decrease while the effective resistance 35' will increase. For this example, any variation in the resistances 36' and 38' will be equal and of the same sense. From a study of FIGURE 5 it will be understood that the previously balanced network including the four resistances 35', 36', 37', and 38' will now be unbalanced and that a net current will flow through the coupling transformer 72 primary 73. This will induce a control signal in the secondary winding 74. The control voltage is applied to amplifier 85. The amplified signal is applied through leads 86 and 87 to the winding means 26 of the motor means 23. The energization to the winding 26 of the control motor 23 produces a rotating magnetic flux which will impart a rotation through the rotor member 24 to the chamber 20. The rotation of the chamber 20 will tend to return the float 32 toward a centered position. This is because the more dense fluid will be driven by centrifugal force toward the periphery of the rotating container. The speed of rotation of chamber member 20 will be that at which the force on the float 32 due to the initial linear acceleration will be opposed by an equal and opposite force caused by the rotation of the chamber 20. Therefore the centrifugal force of the fluid balances the linear acceleration force acting on the sensor.

The static force balance equation for the apparatus can be written as:

$$A = \omega^2 r$$

where:

$A$ = input acceleration
$\omega$ = angular velocity of housing
$r$ = distance from center of rotation to the centroid of the fluid A single integration of the above equation produces the equation $V=r\omega\theta$ where $\theta$ is the instantaneous angular displacement of the rotating housing and V is the linear velocity.

A second integration produces the equation $X=r/2\theta^2$ where X is indicative of linear distance. It will be noted in FIGURE 5 that the displacement pickoff 50 produces the instantaneous angular displacement $\theta$ of the rotating housing and that the output of the squaring means 93 produces the signal $\theta^2$. Thus the apparatus described produces a first signal which is indicative of the linear velocity of the means upon which the accelerometer is mounted and a second signal which is indicative of the distance traversed by the means upon which the accelerometer is mounted.

It will be understood that at times the float 32 will be displaced due to acceleration away from its centered position in a direction having components both in the direction of electrodes 35 and 37 and in the direction of electrodes 36 and 38. For this case, the network will be unbalanced with central signals being induced in both secondary windings 74 and 78 of coupling transformers 72 and 76. The control signals will be additive and their sum will be applied through amplifier 85 to energize motor means 23 to cause rotation of housing 20 and the resulting recentering of the float 32 due to the centrifugal force of the liquid.

FIGURES 3 and 4 depict an alternate configuration for the accelerometer. Reference numeral 111 depicts the base or support for the apparatus. A chamber member 120 is positioned within the support 111 and is adapted to be spun by a motor means 123 about an axis defined in part by a bearing means 117. The chamber 120 contains within a conductive fluid 130 and has a plurality of equally spaced circumferentially located radial electrodes 135, 136, 137, and 138. The chamber 120 contains spherically shaped float means 132 having a density less than that of the conductive fluid 130. A slip ring and brush assembly 140 provides a means for electrically connecting the electrodes 135-139 to external circuit means such as the network shown in FIGURE 5.

A displacement pickoff which may be of any suitable type such as the type disclosed in the aforementioned copending application of Vernon H. Aske et al. is depicted by reference numeral 192 and is mechanically connected through a suitable shaft 193 to the motor means 123.

The general theory of operation of the accelerometer shown in FIGURES 3 and 4 is the same as for FIGURES 1 and 2. The displacement pickoff 192 will be rotated by the motor means 123 and will produce an output signal $\theta$ indicative of the linear velocity of the means upon which the accelerometer is mounted and the signal $\theta$ would be applied to suitable squaring means such as squaring means 93 to produce a signal $\theta^2$ indicative of the linear distance traversed by the means upon which the accelerometer is mounted.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of the present invention.

What we claim is:

1. Apparatus of the class described comprising: a support; a chamber member rotatably mounted on said support for unlimited rotation about a first axis and adapted to contain a conducting fluid having predetermined resistivity characteristics; a motor comprising a first part mounted on said support, a second part rotatably mounted on said support and connected to said chamber member, and winding means adapted when energized to cause said second part to rotate relative to said first part; a spherically shaped float member floated in said fluid within said chamber member and adapted to have a substantial clearance therewith; four equally spaced circumferentially arranged electrodes on the inside of said chamber member and in contact with said fluid; an axial electrode on the inside of said chamber member and in contact with said fluid; a network connected to said electrodes and including output terminals; means for energizing said network; means connecting said output terminals to said motor winding means, said network having an output indicative of said float member being displaced from a symmetrical position relative to said four circumferential electrodes; means responsive to the displacement of said second motor part relative to said first motor part, and adapted to produce a signal indicative of said displacement; and means connected to said responsive means and adapted to produce a signal indicative of said displacement signal raised to a power of two.

2. Apparatus of the class described comprising: a support; a chamber member rotatably mounted on said support for unlimited rotation about a first axis and adapted to contain a conducting fluid having predetermined resistivity characteristics; motor means comprising a first part mounted on said support, a second part rotatably mounted on said support and connected to said chamber member, and means adapted when actuated to cause said second part to rotate relative to said first part; symmetrically shaped float means floated in said fluid within said chamber member and adapted to have a substantial clearance therewith; a plurality of electrodes circumferentially positioned around the inside of said chamber member and in contact with said fluid; an axial electrode on the inside of said chamber member and in contact with said fluid; a network connected to said electrodes and including output terminals; means for energizing said network; means connecting said output terminals to said motor means, said network having an output indicative of said float member being displaced from a symmetrical position relative to said plurality of circumferentially positioned electrodes; means responsive to the displacement of said second motor part relative to said first motor part, and adapted to produce a signal indicative of said displacement; and means connected to said responsive means and adapted to produce a signal as a function of said displacement signal.

3. Apparatus of the class described comprising: a support; a chamber member rotatably mounted on said support for unlimited rotation about a first axis and adapted to contain a conducting fluid having predetermined resistivity characteristics; motor means comprising a first part mounted on said support, a second part rotatably mounted on said support and connected to said chamber member, and means adapted when actuated to cause said second part to rotate relative to said first part; symmetrically shaped float means floated in said fluid within said chamber member and adapted to have a substantial clearance therewith; a plurality of electrodes circumferentially positioned around the inside of said chamber member and in contact with said fluid; an axial electrode on the inside of said chamber member and in contact with said fluid; a network connected to said electrodes and including output terminals; means for energizing said network; and means connecting said output terminals to said motor means, said network having an output indicative of said float member being displaced from a symmetrical position relative to said plurality of circumferentially positioned electrodes.

4. Apparatus of the class described comprising: a support; a chamber member rotatably mounted on said support for unlimited rotation about a first axis and adapted to contain a conducting fluid having predetermined resistivity characteristics; motor means comprising a first part mounted on said support, a second part rotatably mounted on said support and connected to said chamber member, and means adapted when actuated to cause said second part to rotate relative to said first part; symmetrically shaped float means floated in said fluid within said chamber member and adapted to have a substantial clearance therewith; a plurality of electrodes circumferentially positioned around the inside of said chamber member and in contact with said fluid; an axial electrode on the inside of said chamber member and in contact with said fluid; a network connected to said electrodes and including output terminals; means for energizing said network; means connecting said output terminals to said motor means, said network having an output indicative of said float member being displaced from a symmetrical position relative to said plurality of circumferentially positioned electrodes; and means responsive to the displacement of said second motor part relative to said first motor part, and adapted to produce a signal indicative of said displacement.

5. Apparatus of the class described comprising: a support; a hollow chamber member rotatably mounted on said support for unlimited rotation about a first axis and adapted to contain a conducting fluid having predetermined resistivity characteristics; a motor comprising a first part mounted on said support, a second part mounted for rotation relative to said first part and connected to said chamber member, and winding means adapted when energized to cause said second part to rotate relative to said first part; fluid displacing float means in said fluid within said hollow member and adapted to have a substantial clearance therewith; a plurality of electrodes circumferentially positioned about the inside of said hollow member and in contact with said fluid; a network connected to said electrodes and including output terminals; means for energizing said network; means connecting said output terminals to said motor winding means, said network having a null output when said float means is symmetrically positioned relative to said electrode and having an output indicative of said float means being displaced in response to acceleration perpendicular to said first axis from a symmetrical position relative to said plurality of electrodes; means responsive to the angular displacement of said second motor part relative to said first motor part, and adapted to produce a signal indicative of said displacement; and means connected to said responsive means and adapted to produce a signal as a function of said displacement signal raised to a power of two.

6. Apparatus of the class described comprising: a support; a chamber rotatably mounted on said support and adapted to contain a fluid; a float within said chamber floated in said fluid; means for spinning said chamber with its contents as a function of relative radial movement between said float and said chamber; pickoff means for producing a signal indicative of the angular displacement of said chamber relative to said support; and means connected to said pickoff means for producing a signal indicative of said displacement signal raised to a power of two.

7. Apparatus of the class described comprising: a support; a hollow member rotatably mounted on said support; fluid in said member; a float within said member floated in said fluid; means for spinning said member with its contents as a function of relative radial movement between said float and said member; means for producing a signal indicative of the angular displacement of said member relative to said support; and signal modifying means connected to said signal producing means.

8. Apparatus of the class described comprising: a support; a chamber rotatably mounted on said support; fluid in said chamber; a member within said chamber, said member being characterized by having a density less than said fluid, said member being substantially supported by said fluid for movement relative to said chamber; means for producing a signal indicative of relative radial movement between said member and said chamber; and means for rotating said chamber relative to said support as a function of said signal.

9. Apparatus of the class described comprising: a support; a chamber rotatably mounted on said support; fluid in said chamber; a member within said chamber, said member being characterized by having a density less than said fluid, said member being principally supported by said fluid for movement relative to said chamber; means for producing a signal indicative of relative radial movement between said member and said chamber; means for rotating said chamber relative to said support as a function of said signal; and means for producing a signal indicative of the angular displacement of said chamber relative to said support.

10. Apparatus of the class described comprising: a support; a container rotatably mounted on said support and adapted to contain a fluid; float means in said fluid; means for spinning said container with its contents as a function of relative radial movement between said float means and said container; and means responsive to the angular displacement of said container relative to said support for producing a distance signal.

11. Apparatus of the class described comprising: a support; a container rotatably mounted on said support and adapted to contain a fluid; float means in said fluid; means for producing a signal indicative of relative radial movement between said float means and said container; and means connected to said signal producing means for rotating said container.

References Cited in the file of this patent

UNITED STATES PATENTS

| | | |
|---|---|---|
| 2,319,940 | Marrison | May 25, 1943 |
| 2,406,087 | Mallory | Aug. 20, 1946 |
| 2,416,110 | Mallory | Feb. 18, 1947 |
| 2,677,270 | Sanderson | May 4, 1954 |
| 2,797,912 | Trostler | July 2, 1957 |
| 2,840,366 | Wing | June 24, 1958 |
| 2,861,425 | Williams | Nov. 25, 1958 |
| 2,865,624 | Skellern | Dec. 23, 1958 |